(No Model.)

S. P. HEDGES.
POTATO DIGGER.

No. 271,068. Patented Jan. 23, 1883.

WITNESSES:
Chas. Nida
C. Sedgwick

INVENTOR:
S. P. Hedges
BY Munn & Co
ATTORNEYS.

UNITED STATES PATENT OFFICE.

SAMUEL P. HEDGES, OF GREENPORT, NEW YORK.

POTATO-DIGGER.

SPECIFICATION forming part of Letters Patent No. 271,068, dated January 23, 1883.

Application filed August 31, 1882. (No model.)

*To all whom it may concern:*

Be it known that I, SAMUEL P. HEDGES, of Greenport, in the county of Suffolk and State of New York, have invented certain new and useful Improvements in Potato-Diggers, of which the following is a full, clear, and exact description.

Reference is to be had to the accompanying drawings, forming part of this specification, in which similar letters of reference indicate corresponding parts in all the figures.

Figure 1:
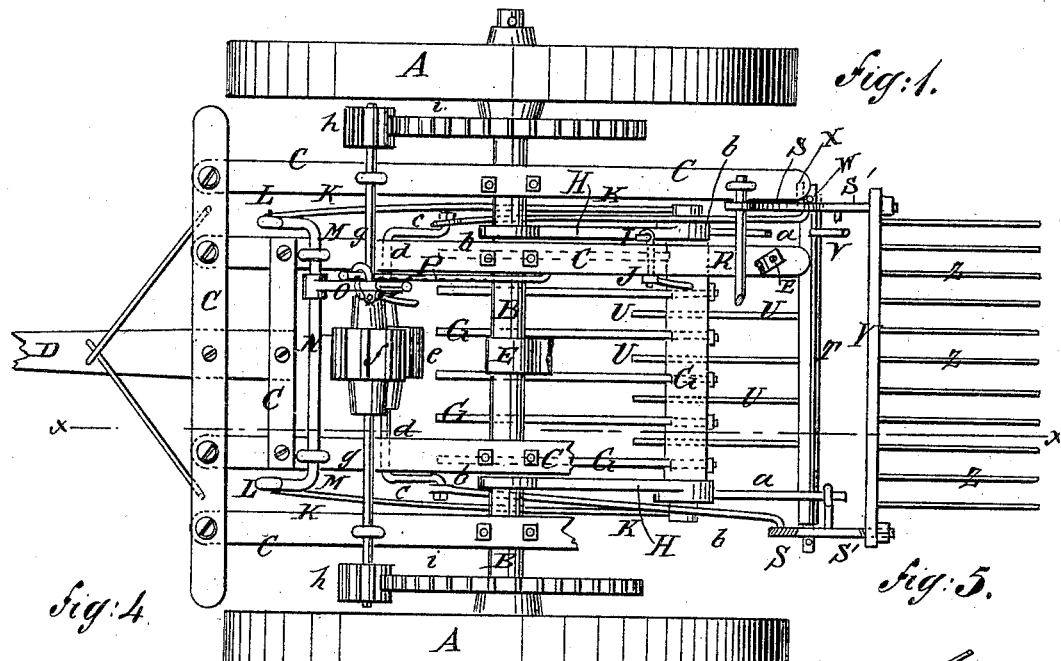
Figure 2:
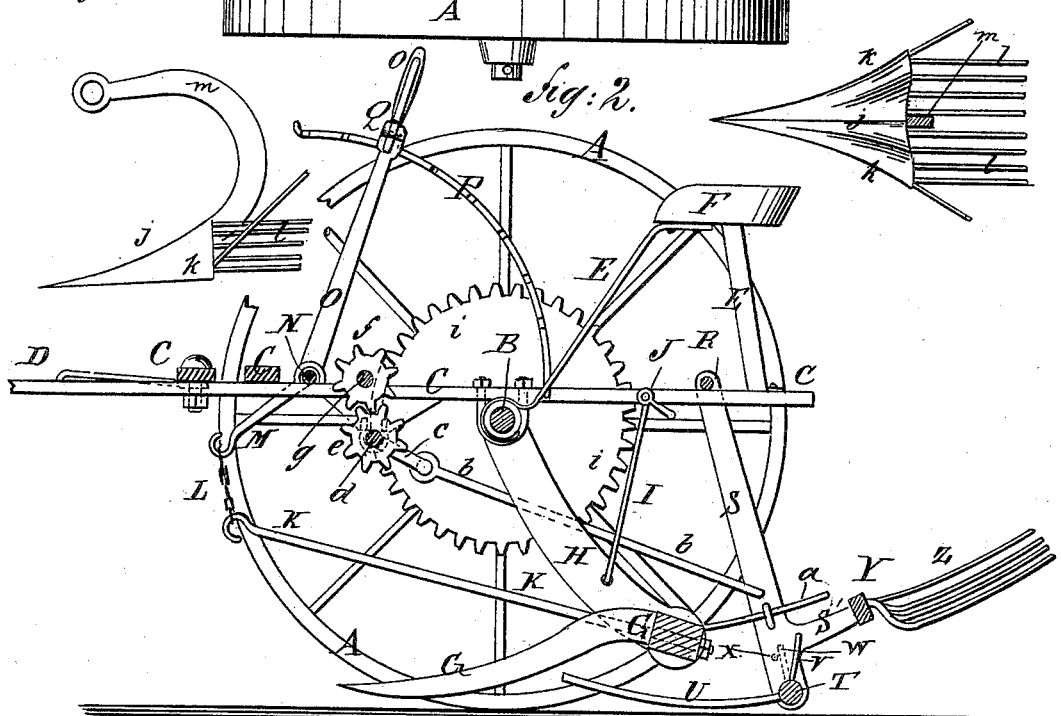
Figure 3:
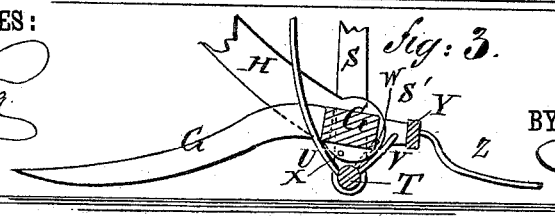

Figure 1 is a plan view of my improvement, parts being broken away. Fig. 2 is a sectional side elevation of the same. Fig. 3 is a sectional elevation of the plow, the separator, and the sifter, showing the separator raised. Fig. 4 is a side elevation of another form of plow. Fig. 5 is plan view of the same, the beam being shown in section.

The object of this invention is to facilitate the digging of potatoes and their separation from the soil.

The invention consists in a potato-digger constructed with a carriage, having suspended therefrom a fork-plow, adjusted by a lever, a crank-shaft, and connecting-rods. From the frame of the carriage, in the rear of the fork-plow, is suspended by hinged bars a shaft provided with curved fingers, arranged to pass up between the plow-prongs, and with stops to cause and limit its movements, whereby the potatoes are raised from the plow and separated from the soil. To arms formed upon the hinged bars of the separator is attached a cross-bar provided with fingers to receive the potatoes from the plow and separator, to sift out the adhering soil, and deposit the potatoes in a compact row upon the ground, as will be hereinafter fully described.

A are the wheels, the axle B of which is attached to the frame C.

To the forward end of the frame C is attached the tongue D, and to its rear part are attached the standards E, that support the driver's seat F.

G is the plow, which is formed of a head or cross-bar having a number of prongs formed upon or attached to it. The prongs of the fork-plow G project forward and are slightly inclined or curved downward and forward, and are rounded or inclined upon the lower side of their forward parts, so that they will enter the ground easily, and so that as they pass through the ground the potatoes and the soil adhering to them will be raised above the surface of the ground.

Upon the ends of the head of the fork-plow G are formed journals, which work in the bearings in the lower ends of the bars H. The bars H are curved forward and upward, and have holes formed in their upper ends to receive the axle B.

The lower ends of the plow draw-bars H are supported at the desired distance above the ground by the rods I, the lower ends of which are attached to the said draw-bars H, and their upper ends are secured adjustably to the side bars of the frame C by eyebolts J, or other suitable means.

To the ends of the head of the plow G are rigidly attached the rear ends of two rods, K, the forward ends of which are connected by links or short chains L with the crank-arms M, formed upon or rigidly attached to the ends of the short shaft N. The shaft N rocks in bearings attached to the frame C, and to it is rigidly attached the end of a lever, O, which projects upward into such a position that it can be readily reached and operated by the driver from his seat F. The upper part of the lever O moves along a curved catch-car, P, with which it is connected by a lever-pawl, Q, or other convenient fastening that can be readily disengaged and will hold the said lever O securely in any position into which it may be adjusted. With this construction, by operating the lever O the plow G will be adjusted to work at any desired depth in the ground.

To the rear parts of the side bars of the frame C are hinged by a rod, R, or other suitable means the upper ends of two bars, S, in bearings in the lower ends of which work the ends of a shaft, T.

To the shaft T are attached the ends of a number of slightly-curved fingers, U, in such positions as to be opposite the spaces between the prongs of the fork-plow G, so that when the separator is swung forward the fingers U can pass up between the said prongs.

To the separator-shaft T is attached an upwardly-projecting stop or lever pin, V, which, when the separator is swung forward, strikes against the head of the plow G and turns the shaft V, which causes the fingers U to rise through the spaces between the prongs of the fork-plow G, raising the potatoes that may be upon the said prongs, shaking off the soil adhering to the said potatoes, and causing the said potatoes to pass over the head of the said plow G. As the separator is swung back the fingers U are drawn back under the plow-head to their former position, ready to be again swung forward below the prongs to separate another lot of potatoes from the soil adhering to them. With this construction, the shaft T of the separator being free to turn upon its bearings within certain limits, the fingers U can be withdrawn longitudinally through the spaces between the prongs of the plow G, so that their withdrawal cannot be obstructed by stalks or soil upon the said prongs.

The fingers U are kept from dropping down too low when the separator is drawn back by stop-pins W, attached to the shaft T, and which strike against stop-pins or projections X, attached to the hinged bars S.

Upon the lower parts of the hinged bars S are formed short rearwardly-projecting arms S', to the rear ends of which are attached the ends of a cross-bar, Y. To the cross-bar Y are attached the ends of fingers Z, which are bent near their shanks, as shown in Fig. 2, so as to give a scoop shape to the sifter. With this construction, as the separator S T U moves forward it carries the sifter Y Z with it into such a position as to receive the potatoes from the plow G, and the separator S T U sifts out any soil that may still remain with them, and discharges the said potatoes from the middle part of its rear end, so that the potatoes will be left in a compact row upon the top of the soil.

The separator S T U and the sifter Y Z are made to move forward and back in a straight line by guide-arms $a$, attached to or formed upon the bars H, and which pass back along the inner sides of the bars S or through guides attached to the said bars S. By this arrangement stalks or other rubbish cannot collect upon the said guide-arms and clog the movements of the separator and sifter, but will pass off at the rear ends of the said guide-arms.

To the lower parts of the hinged bars S are hinged the rear ends of two rods, $b$, the forward ends of which are pivoted to cranks $c$, formed upon or attached to the ends of a shaft, $d$. The crank-shaft $d$ revolves in bearings attached to the frame C, and to the said shaft is attached a small gear-wheel, $e$, the teeth of which mesh into the teeth of a small gear-wheel, $f$, attached to the shaft $g$. The shaft $g$ revolves in bearings attached to the frame C, and to its ends are attached small gear-wheels $h$, the teeth of which mesh into the teeth of the large gear-wheel $i$, attached to the drive-wheels A. By this construction the separator S T U and the sifter Y Z will be operated by the advance of the machine.

If desired, the fork-plow G may be replaced by a plow having a central colter, $j$, a concaved wing, $k$, upon each side, and rearwardly-projecting fingers $l$ at the rear edge of its wings. In this case the plow can be provided with a beam, $m$, in the manner of an ordinary plow, to be attached to the middle part of the axle B, or to some other suitable support.

Having thus fully described my invention, I claim as new and desire to secure by Letters Patent—

1. In a potato-digger, the combination, with the frame and a forked plow, of oscillating bars hinged to the rear of the frame, a shaft journaled in the lower end of said bars and provided with fingers, and means, substantially as herein shown and described, for causing the fingers to pass up between the prongs of the plow by the forward movement of said bars, as and for the purpose set forth.

2. In a potato-digger, the combination, with the carriage A B C and the plow G, of the hinged bars S, the shaft T, provided with the fingers U and the stop-pin V, and journaled in the lower ends of the bars, and means for oscillating said bars, substantially as and for the purpose set forth.

3. In a potato-digger, the combination, with the carriage A B C and the fork-plow G, of the hinged bars S, the shaft T, having curved fingers U and stops V W X, and the rods $b$, the crank-shaft $c$ $d$, and gear-wheels $e$ $f$ $h$ $i$, substantially as herein shown and described.

4. In a potato-digger, the combination, with the fork-plow G and the separator S T U, having arms S', of the sifter Y Z, substantially as herein shown and described, and for the purpose set forth.

SAMUEL P. HEDGES.

Witnesses:
CHAS. H. TUTHILL,
B. P. ADAMS.